United States Patent [19]

Toth et al.

[11] 3,996,038

[45] Dec. 7, 1976

[54] MUSHROOM GROWING PROCESS

[75] Inventors: Ernö Töth; Läszlö Töth; Imre Heltay, all of Budapest, Hungary

[73] Assignee: Licencia Talalmanyokat Ertekesito Vallalat, Budapest, Hungary

[22] Filed: Mar. 7, 1974

[21] Appl. No.: 448,948

Related U.S. Application Data

[63] Continuation-in-part of Ser. No. 147,617, May 27, 1971, abandoned.

[52] U.S. Cl. .......................................... 71/5; 47/1.1
[51] Int. Cl.² ..................... C05F 11/00; A01G 1/04
[58] Field of Search ............................ 47/1.1; 71/5

[56] References Cited

UNITED STATES PATENTS

| | | | |
|---|---|---|---|
| 2,060,223 | 11/1936 | Lambert et al. | 47/1.1 |
| 2,723,493 | 11/1955 | Stoller | 47/1.1 |
| 3,560,190 | 2/1971 | Hughes et al. | 71/5 |
| 3,717,953 | 2/1973 | Kuhn et al. | 47/1.1 |
| 3,820,278 | 6/1974 | Giasante | 47/1.1 |

FOREIGN PATENTS OR APPLICATIONS

| | | | |
|---|---|---|---|
| 2,012,423 | 10/1971 | Germany | 47/1.1 |
| 2,151,326 | 4/1973 | Germany | 47/1.1 |
| 160,232 | 3/1973 | Hungary | 47/1.1 |

*Primary Examiner*—Robert E. Bagwill

[57] ABSTRACT

A cellulosic starting material, substantially devoid of nitrogen values is moistened to bring its water content to at least 50%, pasteurized by steam treatment during which the temperature is increased to a maximum of about 70° C and maintained at such temperature for about 12 hours during which time a relative humidity of about 100% is likewise maintained whereby the starting material is digested. The material is cooled to about 55° C to proliferate thermophilic metabolite producing microorganisms. This temperature is maintained for about 36 hours and is then lowered to about 40°–45° C and maintained at that level for about 24 hours whereby another group of microorganisms is proliferated. The substrate so produced is cooled to 25° C or less. The process provides the substrate with metabolites that protect it against microorganisms which compete for substrate carbon sources with the macrofungi to be cultivated on the substrate.

4 Claims, No Drawings

MUSHROOM GROWING PROCESS

This invention relates to a process for the production of a nutrient culture medium, hereinafter referred to as "substrate", for growing macrofungi, particularly edible macrofungi, e.g. mushrooms.

Several methods are known for producing growth factors and nutrients needed for cultivation of macrofungi and for preparation of substrates for macrofungal growth. The method employed has a decisive effect upon productivity and cost of the fungi cultivation process.

The principle component of the substrate is carbon of organic orgin. It is essential for fungal growth.

Known methods for producing substrates for fungal growth can be summarized as follows:

1. those in which the substrate is used as is, viz. without treatment, or in a physically modified form, e.g. in the cultivation of xylophagous mushrooms on wood, the wood is first ground to small particle size;
2. those in which the substrate is microbiologically transformed, e.g. the traditional method for cultivating agaric or common mushroom;
3. those in which the substrate is heat sterilized, then, under sterile conditions, growth is allowed to spread throughout the medium, i.e. a deep culture is developed;
4. those in which the substrate is treated (e.g. homogenized) at atmospheric or elevated pressure and employed either without further treatment or after providing it with selective chemical protection; and
5. those in which the substrate is treated at or exposed to atmospheric or elevated pressure, then protected against competing microorganisms by antimetabolite materials without limiting metabolic conditions of the macrofungus to be cultivated in the substrate.

In the last mentioned process (5) the substrate, which contains cellulose necessary for formation of product bodies, is moistened and placed in open growing vessels. Development of the substrate is effected by treating same with steam at temperatures approaching or exceeding 100° C. The treated substrate is then inoculated with a culture or inoculum appropriate for the formation of thermophile microflora and kept under conditions favoring propogation of the desired microorganisms, viz. those which afford protection against harmful microorganisms. Finally, an inoculum of the macrofungus to be cultivated is added to and allowed to proliferate in the substrate.

The inoculum required for formation of the thermophile microflora comprises a moistened cellulosic material of the same composition as the substrate utilized for growth of the desired macrofungi. The moistened cellulosic material is produced by treating the cellulosic material in a water vapor saturated, oxygen containing medium, at a temperature of 45° –62 C.

The above described process is usable for high efficiency industrial-scale cultivation.

It is, however, disadvantageous in that it consists of two stages, which from the point of view of organization of production and labor, creates problems. A two stage process is expensive. Moreover, it increases the time required to prepare the substrate. Pressure treatment necessitates the use of relatively expensive equipment. The heat energy input requirement is high. Furthermore, processing of the substrate is highly labor intensive since after the development treatment stages, the substrate must be removed from the treatment vessels, then replaced therein after inoculation with the thermophile inoculum. Only then can development of the antimetabolite protection stage follow.

Another problem common to prior art processes for cultivation of macrofungi concerns the method for producing the incoulum, more particularly the method of proliferating the mycelium in the inoculum culture medium or substrate. The inoculum is typicaly prepared in the laboratory as follows:

A synthetic culture medium or carrier is prepared then sterilized. Mycelium of the macrofungus to be cultivated are introduced into the sterile medium and allowed to proliferate therein. The inoculum so produced is then directly used to inoculate the substrate upon which the desired macrofungi are to be cultivated.

Although this method affords complete certainty of result, it is expensive. Several attempts have been made to reduce cost by attempting to provide for further propagation of the laboratory-prepared inoculum. However, hitherto known methods have been unable to prevent simultaneous propagation of competing microorganisms. Thus use of these methods is very risky. If the competing microorganisms prevail, e.g. by subsequent infection, the complete culture of a macrofungi will be ruined.

U.S. Pat. No. 2,723,493, discloses a composting method wherein a mixture of organic materials and minerals (e.g. manure and its straw bedding) is compiled in a bed, mixed and turned while conditioned air is drawn through the bed to effect thermophilic fermentation. During the fermentation a substantial part of the organic content is decomposed in the exothermic process. For proliferation of thermophilic and aerobic microorganisms the nitrogen content of the starting material is increased (at at least 1.5 wt. % Nitrogen). Rapid decomposition of the starting material into compost is in fact the aim of this prior art process. Thermophilic fermentation of the starting substance is completed when available carbon and nitrogen sources are exhausted.

The present invention differs substantially from prior art processes such as the last mentioned method. This invention, does not aim at composting. The goal of the invention is preservation, not decomposition, of the starting material.

In the production of macrofungi, particularly edible macrofungi, e.g. mushrooms, microbial decomposition of the substrate is disadvantageous. It is obviously better that organic components of the substrate be utilized by the growing macrofungi rather than by the competing microorganisms. Oxidation of carbon sources into forms readily utilizable by microbes present, as is required in composting methods, is not a desired end of the method of the present invention. Instead, this invention seeks to eliminate microbial competition for carbon sources in the substrate by promoting thermophilic aerobic microorganisms present to produce during proliferation, metabolites which inhibit growth of said competing microorganisms.

The invention comtemplates the preparation of substrates for growing macrofungi, particularly edible macrofungi, e.g. mushrooms, which substrates are protected against microorganisms that adversely affect macrofungal yield (e.g. mold fungi). A method is provided by which cellulosic substances, preferably derived from green plants, are transformed, in the presence of thermophilic microorganisms, into a substrate particularly suitable for growing macrofungi.

The cellulosic substance employed as starting material either contains thermophilic microorganisms or is inoculated therewith from an external source. The starting material should contain substantially no nitrogenous components. Moreover no materials should be added to the cellulosic starting material which would add nitrogen values thereto. The absence of nitrogen containing additives or starting materials is essential to securing a high level of the desired competitive microorganism-inhibiting metabolites.. In accordance with the invention, in the absence of nitrogen sources, the thermophilic aerobic cellulose decomposing microorganisms are substantially incapable of decomposing organic carbon sources present in the starting material.

Temperature of the present process is suitably adjusted to insure that a substrate well suited for growth of macrofungi, particularly edible macrofungi is obtained, said substrate having an organic content substantially unchanged from that of the starting material and being protected against the growth of competing organisms such as mold fungus.

In addition to providing a method for producing substrates for growing macrofungi, the present invention provides a method for preparing an inoculumn used in the production of such substrates and a method for cultivating said macrofungi wherein said substrates are employed.

The process of the present invention provides conditions necessary for increasing the activity of the thermophilic microorganisms. These conditions are as follows:

1. The cellulosic starting material must have a moisture/of about 50–60% by weight;
2. Adequate aeration must be provided;
3. The temperature ranges from 45° to 70° C, with the temperature values being adjusted according to a specific periodicity and sequence.

It is important to note that the starting material is neither agitated nor stirred diring the microbiological transformation.

The process of the present invention is preferably carried out in the following manner:

A cellulosic starting material, preferably of green plant origin (never horse dung or other manure of animal orgin) such as for example grain straw, corn stoke, stoke of peeled hemp, or dired pea straw; or a cellulose containing substance of other than green plant origin such as for example, sawdust, is comminuted to reduce its particle size. The starting material, without addition thereto of any auxilliary nutrients and in the absence of nitrogen sources, is humidified or moistened so that it contains at least 50%, by weight, of water. Preferably, the starting material is moistened by saturating same with hot water having a temperature of about 50°–70° C, the heat content of the hot water then being utilized for pasteurization of the starting material in the heating step which follows. The moistened starting material is filled, preferably in a layer of about 20 to 25 cm., into boxes, more particularly, into perforatd plastic cases. The boxes are then transferred to a heat insulated room wherein the moistened starting material is pasturized by treatment with steam. During this step the temperature is increased to a maximum of about 70° C. whereby the boxed starting material is heated to about 65° to 70° C. This temperature is maintained for about 12 hours. During this 12 hour period, the air in the room is occasionally changed to insure the presence of a suitable oxygen content and, consequently, aerobic conditions. A relative humidity of about 100% is maintained. During this initial heating period the cellulosic starting material is digested. (It should be noted that in the aforementioned steps and in the steps which follow, the starting material is not subjected to mixing, either vertical or horizontal; such agitation is superfluous. Moreover, aeration is effected not by drawing air through a bed of the starting material but by placing the starting material in an atmosphere wherein temperature and change of air are properly adjusted.) The digested starting material is then cooled to about 55° C. at which temperature proliferation of the thermophilic metabolite producing microorganisms starts. This temperature is maintained for about 36 hours. The temperature is then lowered to about 40° to 45° C. and maintained at that level for about 24 hours. In this temperature range another group of microorganisms is proliferated. These organisms prefer a lower temperature. Thereafter the cellulosic material is cooled, preferably, with fresh air, over a period of from 6 to 8 hours and to a temperatre of 25° C. or less. Then the thus prepared substrate may be inoculated, preferably, by homogenization, with an inoculum of the macrofungi to be grown.

The process of the present invention, as described above, affords a substrate which is self-protected against noxious and harmful microorganisms.

The process conditions of the present invention spur microorganisms contained in the cellulosic starting material (or introduced therein, as will be discussed later on in the disclosure) to produce metabolites, e.g. antibiotics, which make the produced substrate immune to infection. Moreover, by preventing loss of carbon sources due to microbic competition, the process affords a substrate which is optimal for growth of macrofungi, particularly edible macrofungi such as mushrooms.

The specified temperatures and adjustment thereof according to the specified periodicity and specified sequence called for by the process of the instant invention, are essential to the production of a substrate that is immune to harmful microorganisms yet is digested at a proper rate by the growing macrofungi.

Latent thermophilic microorganisms are present in each cellulosic starting material derived from green plants. These microorganisms are activated by the method of the present invention. In certain cases, for example, when the starting material does not contain a suitable quantity of said latent microorganisms it may be necessary to inoculate the cellulosic starting material with a previously prepared thermophilic microorganism culture, before the temperature treatment is initiated.

The substrate of the present invention may be inoculated with an inoculum of the macrofungus to be grown by mixing said substrate with the inoculum by, for example, homogenization. The inoculated substrate is then stored in a location having optimum temperature and air circulation as to promote the growth of the mycelium of the macrofungus, and is kept under such conditions until the growth proliferates throughout the medium.

The inoculum used to inoculate the substrate may be prepared in the following manner:

Substrate material as described above is employed as the carrier material for the inoculant. The carrier material inoculated with a pure laboratory prepared culture of the desired macrofungi. The optimum ratio of inoculum to carrier material will vary depending on the species and growth factors of the macrofungi inoculated. Expediently, the quantity of inoculum may vary between 0.5–5% by volume. The inoculated carrier material is grown over under strict hygienic conditions in a special inoculum-producing incubation room. During the proliferation of the growth throughout the carrier, the microbiological condition of the air and of the carrier is continuously monitored. Thereafter as described above, a mixing process is used to homogenize the inoculum with the substrate prepared as described above, advantageously in the ratio of 5–10% by volume. This means that for 1m$^3$ substrate only about one-thousandth, i.e. 1 liter, laboratory-prepared inoculum is required. Herein lies one of the significant advantages of the invention, since in the hitherto known processes it has not been possible to reduce to such an extent the amount of the relatively expensive laboratory-prepared inoculum used, for fear of the danger of infection.

The present invention is based on the recognition that, from the point of view of the macrofungus to be cultivated, the hydrolysis process, which converts the cellulosic starting material to useful nutrients, can be carried out at a relatively lower temperature in the presence of sufficent water if thermophile microorganisms are present, since the latter will produce, on proliferation, hydrolysis-promoting enzymes which break down the starting material and additionally produce antimicrobic metabolites which prevent microorganisms from utilizing the substrate carbon sources. The present invention makes it possible to prepare inocula for industrial use which are as useful as laboratory produced inocula but which are substantially cheaper. This is made possible by employing the substrate of the present invention as the nutrient medium or carrier for propagation of the macrofungus to be cultivated.

The following examples offered for the purpose of illustrating the process of the present invention and not in limitation thereof.

EXAMPLE 1

Preparation of a Substrate from Pea Straw

On harvesting pea plants, a dried pea straw starting material is obtained. This starting material is chopped into 1 to 3 cm. pieces then humidified (moistened) with water having a temperature of 70° C. unitl its moisture content is 65%. The humidified straw is filled into 20 cm. deep boxes having a size of 80 to 120 cm. The filled boxes are transferred to a treatment room. The room is sealed and steam is introduced therein. Uniform distribution of the steam and uniform temperature throughout the room is obtained by aerating the room. The starting material is heated, during a period of 4 to 5 hours, to 70° C. This temperature is maintained for twelve hours during which time fresh air is introduced into the room and a relative humidity of 100% is maintained. After twelve hours, cool air is introduced to decrease the temperature of the starting material to 55° C. This temperature is maintained for 36 hours during which time maintenance of aeration and the relative humidity of the room is continued. The temperature is then reduced to 40° to 45° C and maintained at that level for 24 hours. After completion of this cooling period the material is further cooled to 25° to 35° C.

The substrate so produced can be inoculated with Pleurotus ostreatus and mushrooms grown under known conditions.

Using the above described substrates were prepared from grain straw, corn stoke, rice hull and corn cob.

EXAMPLE 2

Preparation of a Substrate from Saw Dust

Sawdust was humidified with warm water having a temperature of 70° C. 5 volume % straw substrate, prepared according to Example 1, is mixed with the saw dust. This saw dust substrate serves as an inoculum for thermophilic microorganisms. Because sawdust is not a living greenplant and does not contain thermophilic microorganisms the thermophilic microorganisms must be added from an external source. The remainder of the process was then carried out as described in Example 1.

The substrate so produced was cooled, then inoculated with an inoculum of Agrocybe aegerita, an edible mushroom, and after an incubation time of 21 days, mushroom were grown at a temperature of 2° C and in a relative humidity of 90%.

EXAMPLE 3

Production of Inoculum for the Cultivation of Pleurotus Ostreatus

The substrate for the inoculum is prepared in the manner described in Example 1. In practice it is prepared simultaneously with the preparation of the substrate required for the cultivation.

After the last step in the preparation of the substrate and its cooling, a portion of the substrate is inoculated and mixed with a 2% by volume laboratory prepared culture of oyster mushroom propagated on millet grains. The inoculated substrate or carrier is placed in a cultivation case and stored in an incubation room. The same conditions are set up in the incubation room as described in Example 1, with the exception that the air is filtered through a glass wool filter, and a slightly elevated pressure is maintained in order to prevent external, unfiltered air from entering. Growth proliferation takes place in about two weeks, and the thus prepared inoculum may then be used, in the manner described in Example 1, for the inoculation of the balance of the substrate of Example 1.

EXAMPLE 4.

Cultivation of Pleurotus Ostreatus

A substrate is prepared according to the method of Example 1 using as starting material maize (corn) cob, excepting that prior to the steam-heat treatment step the starting material is homogenized with 5% by volume of a thermophile microflora inoculum. The substrate thereby produced is homogenized with 10% by volume of the inoculum produced in Example 3. The resultant inoculated substrate is placed in plastic cultivation cases to a maximum depth of 20 cm., is slightly compressed, and placed in a incubation room at a temperature of 20° C and a relative humidity of 90–95%. This temperature and humidity are maintained during development of the mycelium. Appropriate air circulation is provided to remove liberated heat and carbon dioxide. Uniform temperature in the upper an lower levels of the room is ensured by ventilating fans. The substrate, through which growth has proliferated, is transfromed into the final product after secondary ripening.

What is claimed is:

1. A process for preparing a substrate for growing macrofungi comprising the successive steps of heating an at least 50% moisture- containing cellulosic starting material, substantially devoid of nitrogen sources, in the presence of air and in the presence of thermophilic microorganisms, to a maximum temperature of about 70° C; maintaining this temperature, a relative humidity of about 100% and aerobic conditions, for about 12 hours, to effect digestion of the starting material; cooling the digested starting material to about 55° C and maintaining this temperature for about 36 hours to effect proliferation of said thermophilic microorganisms; lowering the temperature to about 40°–45° C and maintaining this temperature for about 24 hours to effect proliferation of another group of microorganisms; then cooling to about 25° C or less and recovering the substrate thereby produced, said starting material, during its microbiological transformation, being subjected to substantially no agitation, mixing, or stirring.

2. The process as claimed in claim 1; wherein thermophilic microorganisms are added to the starting material before it is heated.

3. The process as claimed in claim 2 wherein said moisture containing starting material is produced by contacting a cellulosic material with hot water having a temperature of about 50°–70° C, and the moisture containing cellulosic starting material is heated by contacting same with steam and the heat content of the hot water is utilized for pasteurization of the moisture containing starting material in the steam heating step.

4. The substrate produced by the process as described in claim 1.

* * * * *